J. HARRIS.
MACHINE FOR CUTTING AND WELDING WITH FLUID FUEL.
APPLICATION FILED OCT. 15, 1917.
1,389,046.
Patented Aug. 30, 1921.
3 SHEETS—SHEET 3.
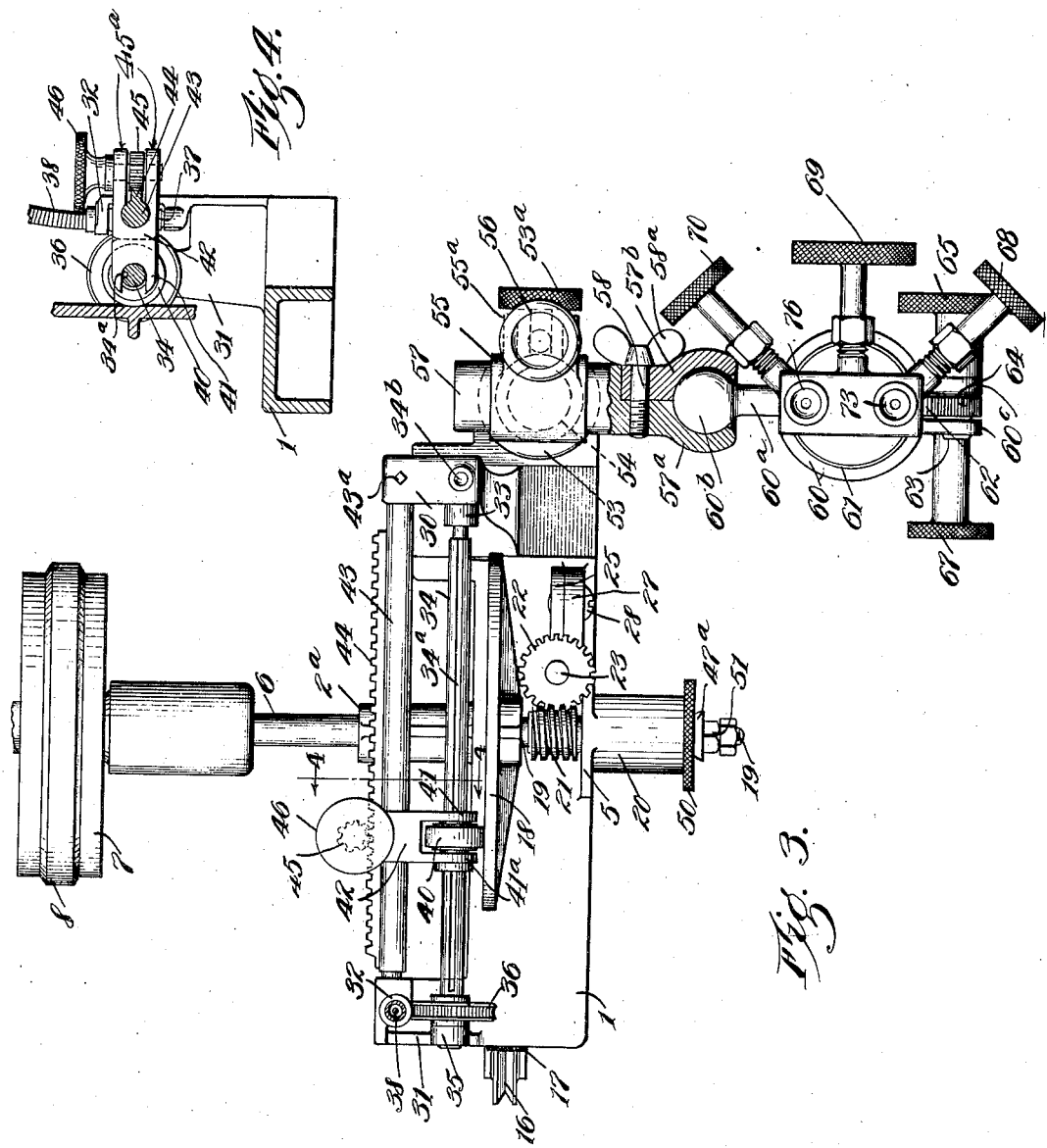
INVENTOR
John Harris,
BY Hull, Smith, Brock & West
ATTYS.

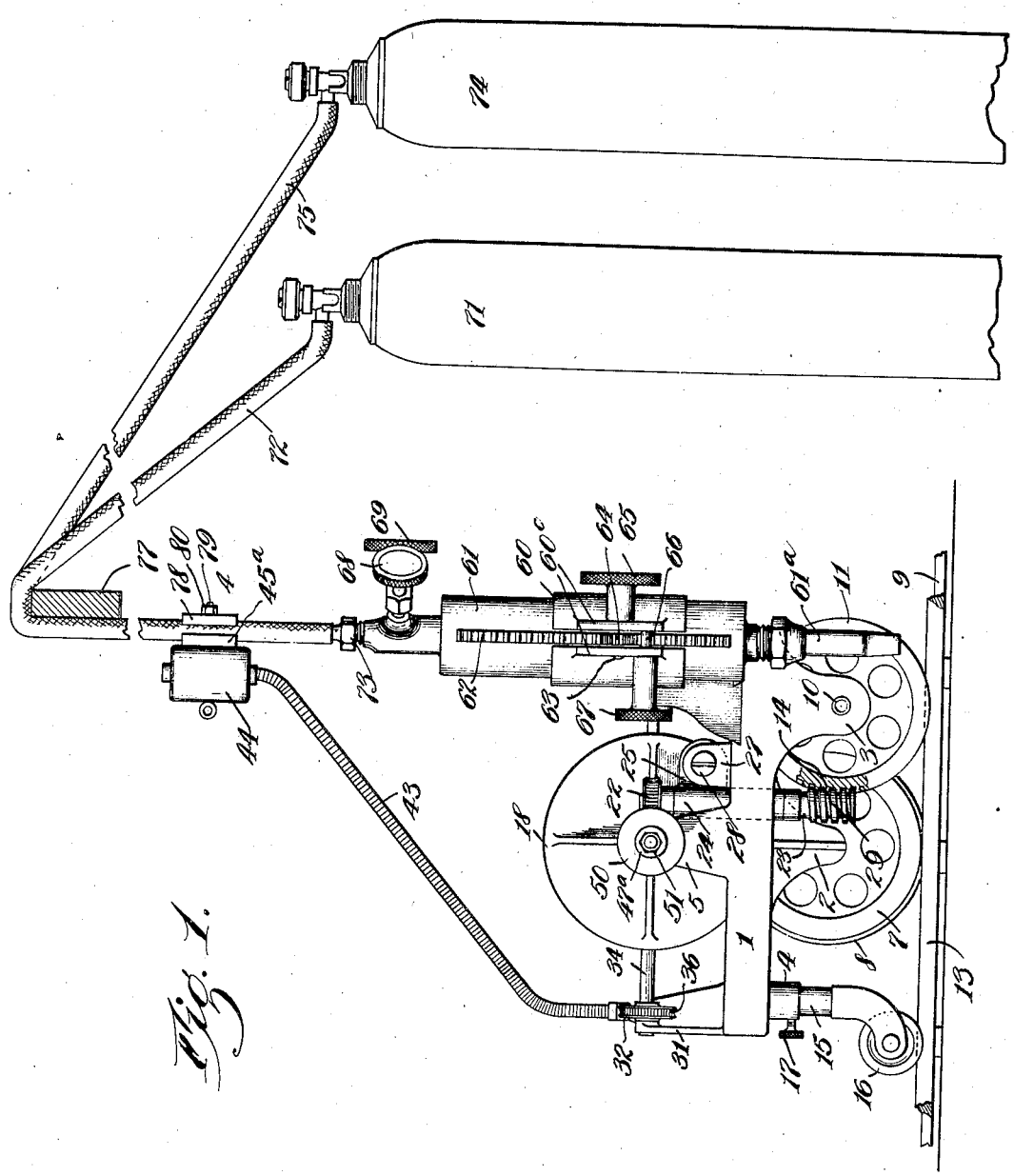

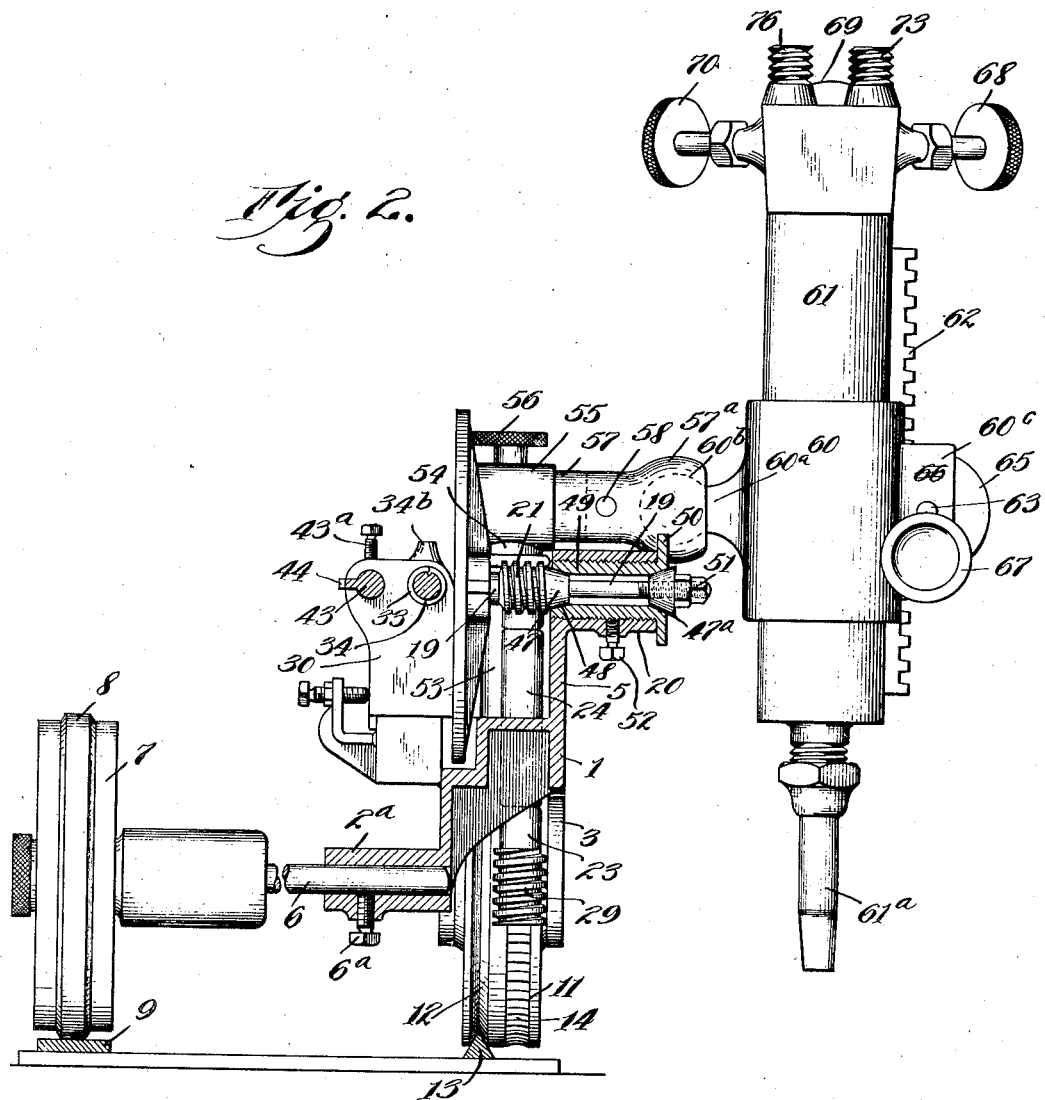

UNITED STATES PATENT OFFICE.

JOHN HARRIS, OF LAKEWOOD, OHIO.

MACHINE FOR CUTTING AND WELDING WITH FLUID FUEL.

1,389,046.  Specification of Letters Patent.  Patented Aug. 30, 1921.

Application filed October 15, 1917. Serial No. 196,703.

*To all whom it may concern:*

Be it known that I, JOHN HARRIS, a citizen of the United States, residing at Lakewood, in the county of Cuyahoga and State of Ohio, have invented a certain new and useful Improvement in Machines for Cutting and Welding with Fluid Fuel, of which the following is a full, clear, and exact description, reference being had to the accompanying drawings.

This invention relates to machines for cutting and welding with gases.

One of the objects of the invention is the provision of a machine of this character with means whereby the speed at which it is moved with reference to the work, as well as its direction of drive, or movement, may be conveniently and efficiently controlled and reversed; also the provision, in such machines, of means whereby the wear of the operating and driving parts may be taken up or compensated.

A further object of the invention is to provide a machine of the character described which, although self-contained, will be relieved of the weight of the motor whereby it is driven.

A still further object of the invention is to provide a machine of the character described with novel and efficient means whereby the torch or blow pipe may be conveniently adjusted toward and from the work as well as at any desired angle with reference to the work and to the direction in which the machine may be driven.

Further and more limited objects of the invention will appear in connection with the descriptive matter in the specification and will be embodied in the combinations of elements included in the claims attached to and forming part hereof.

In the drawings, illustrating one embodiment of my invention, Figure 1 represents a side elevation of a machine of the character described and of the cylinders from which gases are supplied to the torch or blow pipe; Fig. 2 represents a transverse sectional view of the machine shown in Fig. 1, certain parts being shown in elevation; Fig. 3 a plan view of the said machine, the connection between the torch and the support therefor being broken away; and Fig. 4 a detail corresponding to the line 4—4 of Fig. 3.

Describing by reference characters the various parts illustrated, 1 denotes generally the frame of the carriage on which the operating parts are mounted. This frame is provided with depending brackets 2 and 3, a depending sleeve 4, and an upwardly projecting bracket 5. The bracket 2 is provided with a sleeve $2^a$ which forms a support for a spindle 6, the spindle being longitudinally adjustable in the sleeve and being secured in place therein by a set screw $6^a$. On the outer end of the spindle there is journaled a wheel 7, said wheel being provided with a central circumferential tread 8 which is adapted to coöperate with a rail 9.

The brackets 3 support a hollow spindle 10 for a wheel 11. This wheel is provided at one side thereof with a circumferential groove 12 which is preferably triangular in section to coöperate with a rail 13 of similar section. Near its opposite side, the wheel is provided with a worm gear 14, for a purpose to be described hereinafter.

The sleeve 4 forms a journal for the upper end of the shaft 15 of a caster wheel 16 which is preferably provided with a triangular circumferential groove adapted to receive therewithin a triangular rail 13. A set screw 17 is provided for the purpose of clamping the shaft 15 to the sleeve 4.

A friction disk 18 is mounted upon a shaft 19 journaled in a bearing sleeve 20 carried by the bracket 5. On this shaft is a worm gear 21 meshing with a worm wheel 22 on a vertical shaft 23 mounted in a journal 24 carried by a bracket 25 which is connected to a lug 27 on the frame by means of a clamp screw 28. At the lower end of the shaft 23 there is a worm 29 which meshes with the worm gear 14 of the wheel 11. The shaft 23 is pivotally supported from the bracket 27 through the construction just described, whereby it may be adjusted to maintain the driving connections with the worm 21 and the gear 14. 30 and 31 denote uprights carried by the frame 1. The upper end of the upright 31 is bent over parallel with the carriage table, as indicated at 32. The upright 30 is provided with a bearing 33 for one end of the shaft 34, the opposite end of said shaft being journaled to the upright 31, as indicated at 35, and being provided with a worm gear 36 adapted to mesh with a worm 37 supported by the upper portion 32 of the upright 31 and driven by a flexible shaft 38 extending from a constant-speed electric motor 44.

The shaft 34 is provided with a longitudinal keyway 34ª and has mounted thereupon a friction wheel 40 coöperating with said keyway and journaled between the vertical forks 41 and 41ª, of a yoke 42, said yoke being slidably mounted upon the shaft 34 and being horizontally forked at its opposite end to receive therewithin a rod 43 supported by the uprights 30 and 31 and extending parallel with the shaft 34 and carrying a rack 44. A pinion 45 is mounted in the forks 45ª of the said yoke, being rigidly connected to a shaft journaled in said forks and having an operating hand wheel 46. A set screw 43ª is provided for securing the rod 43 in place in the upright 30 and a lubricating cup 34ᵇ is provided in said upright for the journal 33.

The shaft 19 is longitudinally adjustable in the bearing sleeve 20 to enable the disk 18 to be moved toward and from the wheel 45. For securing this adjustment the shaft is provided with a pair of cones 47, 47ª adapted to engage correspondingly shaped seats 48 in a bushing 49 which is threaded into the sleeve 20 and is provided with a knurled head 50 for adjusting the bushing and the shaft toward and from the disk. The cone 47ª is threaded on the shaft and is retained in operative relation to its seat by the nuts 51. A set screw 52 serves to secure the bushing in place within the sleeve.

At its forward end, the carriage frame 1 is provided at its end with a vertical sleeve 53 in which there is slidably mounted a post 54, said post having at its upper end a horizontal split journal sleeve 55, the lugs 55ª whereof are provided with openings for the reception of a screw having an operating head 56 for the purpose of tensioning or loosening the split sleeve 55 about a horizontal post 57. A set screw having an operating head 53ª and mounted in the sleeve 53 serves to secure the post 54 in its various adjusted positions within said sleeve.

At its forward end, the post 57 is fashioned to provide the cupped socket of a universal joint. One half of such socket 57ª is conveniently formed with and as part of the post proper; the other half 57ᵇ of such socket is formed in a member which may be detachably secured to the body of the post by means of a screw 58 threaded into the body of the post and having rigid therewith a wing nut 58ª adapted to clamp the detachable member to the body of the post.

60 denotes a split sleeve having a projection 60ª provided with a ball 60ᵇ adapted to fit within the correspondingly shaped socket at the end of the post 57. The sleeve 60 is adapted to receive therewithin the cylindrical body 61 of a blow pipe, said body having a rack 62 projecting between the flanges 60ᶜ of the sleeve 60, said flanges supporting a shaft 63 carrying a pinion 64 meshing with the rack. The pinion shaft is provided with an operating wheel 65. A set screw 66 connects the flanges 60ᶜ for the purpose of contracting and expanding the sleeve 60, and is provided with an operating wheel 67. The post 57 constitutes a supporting member for the projection 60ª which in turn constitutes a connecting member between the blowpipe and the carriage.

The blow pipe is provided with a suitable tip 61ª and with valves 68, 69, and 70 for controlling the supply of gases to the tip. Oxygen will be supplied from the tank 71 through the flexible tubing 72, connection 73, and valve 68, to mingle with the supply of combustible gas from the cylinder 74, flexible tubing 75, connection 76, and valve 70. Where the torch is to be used for cutting purposes, cutting oxygen will be supplied through a suitable passageway in the torch which is controlled by the valve 69. The construction of blow pipe employed and the arrangement of the passageways for oxygen and combustible gas is preferably that shown in my application No. 146,310, filed February 2, 1917.

The flexible tubes 72 and 75 are shown as extending over a support 77 and the motor 44 is clamped to these tubes above the torch and above the carriage, the motor being provided with a base 45ª to which a clamping plate 78 is connected by means of a bolt 79 projecting from the base through a plate 78 and having a nut 80 on the end thereof. The base 45ª and the plate 78 are preferably recessed so as to provide a secure support for the motor from the flexible tubes.

With the parts constructed and arranged as described, power from the constant speed motor 44 is applied through the flexible shaft 38 and gears 36 and 37 to the shaft 34, thereby driving the friction wheel 45. This in turn drives the friction disk 18 at a speed inversely proportional to the distance of the wheel from the center of the disk. By operating the hand wheel 50, the friction wheel may be adjusted toward, from, and across the center of the disk, whereby the said disk may be driven in reverse directions and at any desired speed in either direction.

The provision of the movable supports and slideways for the shaft 34, rod 43 and associated parts enables the friction wheel to be adjusted toward and from the disk as occasion may require.

By employing a constant speed motor and the speed changing mechanism shown, I am enabled to drive the cutting or welding torch at any desirable speed and to accomplish this result without danger of burning out the motor and without the necessity for using a brake or rheostat.

The manner of supporting the shaft 23 enables me to adjust the same from time to time in order to compensate for the wear and tear on the driving connections between said shaft and the drive wheel 11.

By mounting the motor 44 upon the flexible tubing and supporting the tubing and motor from a part unsupported by the carriage, the carriage is relieved of the weight of said motor, with a corresponding saving in the power required for driving the said carriage, while the motor is supported in convenient relation to the carriage during the travel of the latter.

The manner of supporting the blow pipe enables me to adjust it conveniently to any desired angle and to employ therefor a construction embodying a minimum number of parts.

Having thus described my invention, what I claim is:—

1. In a machine of the character described, the combination, with a carriage, of a torch or blow pipe supported thereby, tubing conducting a gas or gases to said blow pipe, a motor supported independently of said carriage, and a flexible driving connection between said motor and said carriage for propelling the latter.

2. In a machine of the character described, the combination, with a carriage, of a blow pipe or torch on said carriage, means for supplying gases to said blow pipe or torch, a drive wheel supported by said carriage, a friction disk supported by said carriage, a driving connection between said disk and said wheel, a shaft extending across said disk, a friction wheel mounted on said shaft and adjustable therealong, a flexible shaft, means for driving the same, and driving connections between the said shafts.

3. In a machine of the character described, the combination with a carriage, of a blow pipe or torch on said carriage, means for supplying gases to said blow pipe or torch, a drive wheel supported by said carriage, a friction disk supported by said carriage, a driving connection between said disk and said wheel, a shaft extending across said disk, a friction wheel mounted on said shaft and adjustable therealong, a flexible shaft, means for driving the same, and a worm and worm gear connection between the said shafts.

4. In a machine of the character described, the combination, with a carriage, of a blow pipe or torch on said carriage, means for supplying gases to said blow pipe or torch, a drive wheel supported by said carriage, a friction disk supported by said carriage, a driving connection between said disk and said wheel, a shaft extending across said disk, a friction wheel mounted on said shaft and adjustable therealong, means for adjusting one of the aforesaid friction members toward the other, a motor, a flexible shaft therefor, and driving connection between said shafts.

5. In a machine of the character described, the combination, with a carriage, of a blow pipe or torch on said carriage, means for supplying gases to said blow pipe or torch, a drive wheel supported by said carriage, a friction disk supported by said carriage, a driving connection between said disk and said wheel, a shaft extending across said disk, supporting means for said shaft, a friction wheel mounted on said shaft and adjustable therealong, means for adjusting one of the aforesaid friction members toward the other, a gear for driving said shaft located in proximity to such supporting means, a second gear carried by such supporting means and having a driving connection with the first gear, a flexible shaft for driving the second gear, and a motor driving the second shaft.

6. In a machine of the character described, the combination, with a carriage, of a blow pipe or torch supported thereby, means for supplying gases thereto, a friction disk on said carriage, a drive wheel supported by said carriage, a driving connection between said disk and said wheel, a shaft extending across said disk, a friction wheel adjustable longitudinally of said shaft, means for driving said shaft, and means whereby the said disk may be adjusted toward and from said shaft and the friction wheel thereon.

7. In a machine of the character described, the combination, with a carriage, of a blow pipe or torch supported thereby, means for supplying gases thereto, a sleeve on said carriage, a shaft mounted in said sleeve for longitudinal adjustment therein, a friction disk on said shaft, a drive wheel supported by said carriage, a driving connection between said disk and said wheel, a shaft extending across said disk, a friction wheel adjustable longitudinally of said shaft, and means for driving the last-mentioned shaft.

8. In a machine of the character described, the combination with a carriage, of a blow pipe or torch supported thereby, means for supplying gases thereto, a sleeve on said carriage, a shaft mounted in said sleeve for longitudinal adjustment therein, a friction disk on said shaft, a drive wheel supported by said carriage, a driving connection between said disk and said wheel, a shaft extending across said disk, a friction wheel adjustable longitudinally of said shaft, means for driving the last mentioned shaft, and means associated with said sleeve for adjusting the friction disk toward and from the friction wheel.

9. In a machine of the character described, the combination, with a carriage, of a blow pipe or torch supported thereby, means for supplying gases thereto, a sleeve on said carriage, a shaft mounted in said sleeve for longitudinal adjustment therein, a friction disk on said shaft, a drive wheel supported by said carriage, a driving connection between said disk and said wheel, a shaft extending across said disk, a friction wheel adjustable longitudinally of said shaft, means for driving the last-mentioned shaft, means associated with said sleeve for adjusting the friction disk toward and from the friction wheel, said means comprising a bushing adjustable within said sleeve and having bearings for said shaft, and means for securing said bushing in its adjusted positions within said sleeve.

10. In a machine of the character described, the combination, with a carriage, of a blow pipe or torch supported thereby, means for supplying gases thereto, a sleeve on said carriage, a shaft mounted in said sleeve for longitudinal adjustment therein, a friction disk on said shaft, a drive wheel supported by said carriage, a driving connection between said disk and said wheel, a shaft extending across said disk, a friction wheel adjustable longitudinally of said shaft, means for driving the last-mentioned shaft, means associated with said sleeve for adjusting the friction disk toward and from the friction wheel, said means comprising a bushing threaded in said sleeve and having conical seats at opposite ends thereof, a fixed cone and an adjustable cone on said shaft coöperating with said seats, means for securing the adjustable cone to the shaft, and means for securing the bushing to the sleeve.

11. In a machine of the character described, the combination, with a carriage and means for driving the same, of a blow pipe or torch, a support having a universal-joint connection with said blow pipe or torch, a sleeve in which the said support is mounted, and means for adjustably supporting the said sleeve from said carriage.

12. In a machine of the character described, the combination, with a carriage and means for driving the same, of a blow pipe or torch, a support having a universal-joint connection with said blow pipe or torch, a post connected to the said support, a sleeve on said carriage in which the said post is adjustably mounted, and means for securing the said post in its adjusted positions.

13. In a machine of the character described, the combination, with a carriage and means for driving the same, of a supporting member on the carriage, a blow pipe having a connecting member, one of said members comprising a two-par cupped socket and the other member having a ball coöperating with such socket, and means for clamping the two parts of the socket together.

14. In a machine of the character described, the combination with a carriage, and means for driving the same, of a supporting member on the carriage, said member having a two-part end providing a cupped socket, a connecting member carried by the blow pipe or torch and having a ball coöperating with such socket, and means for clamping together the two parts of the socket.

15. In a machine of the character set forth, the combination, with a carriage and means for driving the same, of a support on said carriage, a universal joint member adjustably mounted in said support, a blow pipe or torch, a universal joint member connected with said blow pipe or torch and coöperating with the first mentioned member, and means coöperating with the joint provided by said members for securing the said members in adjusted relation to each other.

In testimony whereof, I hereunto affix my signature.

JOHN HARRIS.